United States Patent [19]

Petrocy

[11] Patent Number: 5,076,505
[45] Date of Patent: Dec. 31, 1991

[54] BOTTLE CRUSHER

[75] Inventor: Richard J. Petrocy, Carteret, N.J.

[73] Assignee: Ecotech, Inc., Carteret, N.J.

[21] Appl. No.: 597,002

[22] Filed: Oct. 15, 1990

[51] Int. Cl.$^5$ .............................................. B02C 19/14
[52] U.S. Cl. ..................................... 241/99; 241/100; 241/195; 241/285 B
[58] Field of Search ....................... 241/99, 100, 101.7, 241/189 R, 37.5, 186 R, 186.3, 195, DIG. 38, 285 R, 285 B

[56] References Cited
U.S. PATENT DOCUMENTS 2,558,255  6/1951  Johnson et al. ........................ 241/99
3,655,138  4/1972  Luscombe ............................. 241/99

Primary Examiner—Mark Rosenbaum
Attorney, Agent, or Firm—Mathews, Woodbridge & Collins

[57] ABSTRACT

A device for crushing glass bottles and other glass containers. This comprises a rectangular housing having an intake slot at the top which directs the intake containers down an inclined plane to an abutment in the interior of the housing which defines a chute for directing the intake containers into the path of a rotating battering ram in the exhaust section of the housing where they are smashed. A frustoconical member focusses the smashed products into a collection pail for periodic removal. Flying glass is minimized by the presence of freely swinging rubber flaps across the intake path, and the angular relationships between the intake and exhaust sections of the housing.

7 Claims, 2 Drawing Sheets

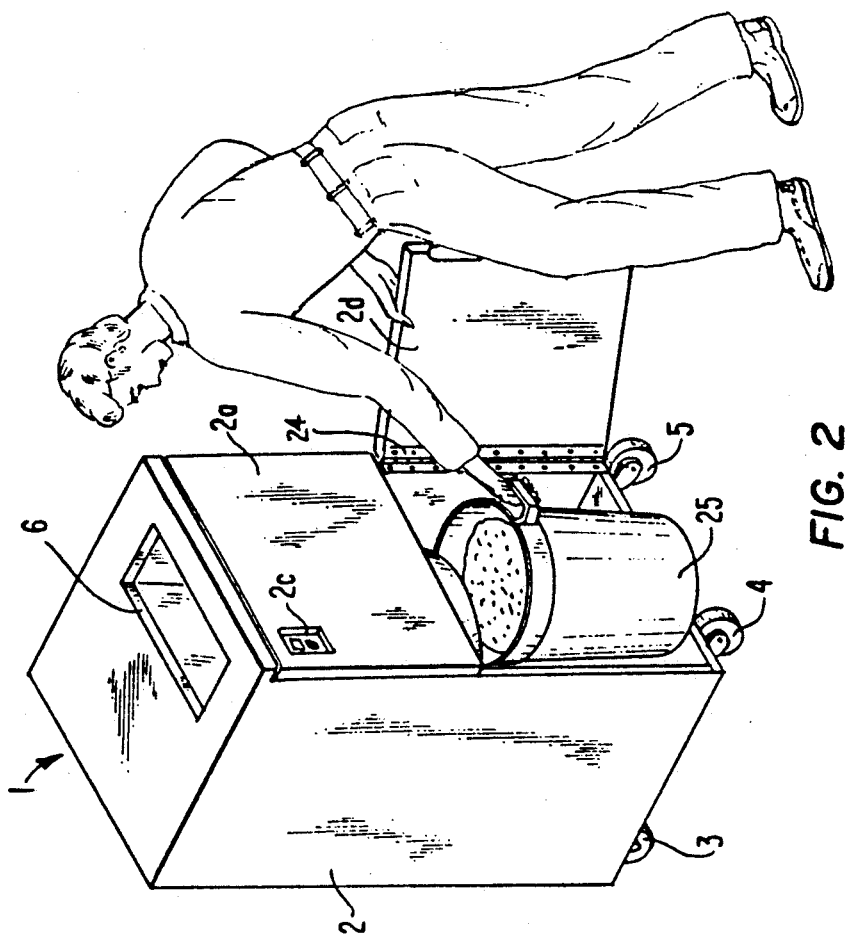
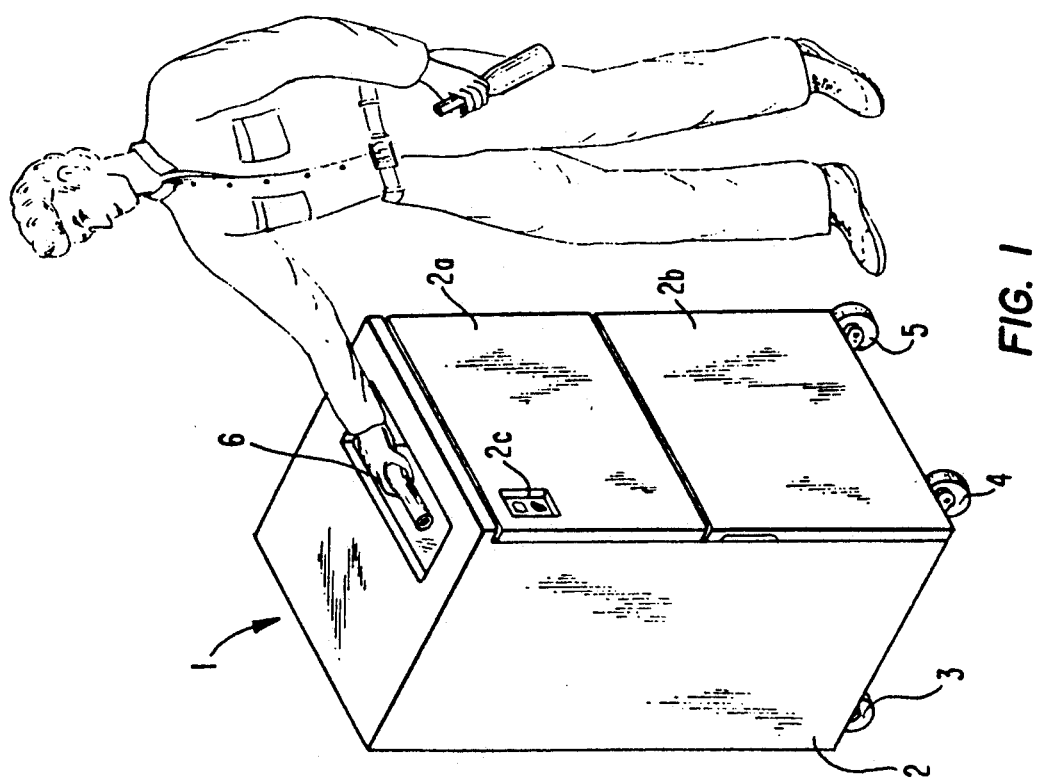

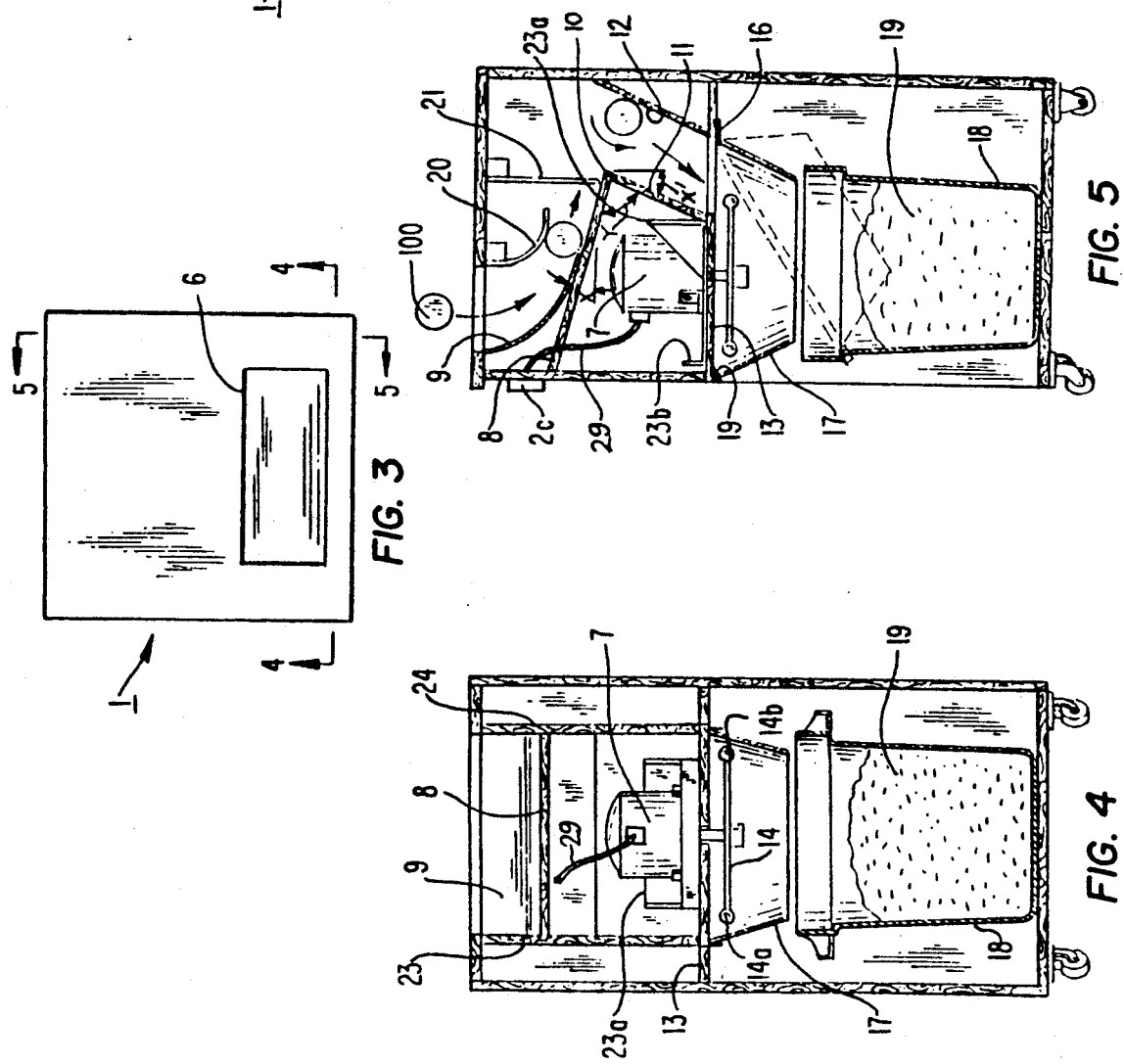

BOTTLE CRUSHER

This relates in general to devices for crushing glass, and more particularly to a device for crushing bottles in bars, stores and other places of business.

Because of the overcrowded conditions of the dumps, many cities have strict ordinances regarding the disposal of glass bottles in a manner which is safe and efficient, and which provides an output which can be readily recycled.

There are many types of devices available in the prior art for crushing glass bottles; but they have the disadvantage of creating flying glass shards which are a danger to the user. Moreover, if the process is slowed down in order to reduce or eliminate the danger of flying glass, it becomes slow and inefficient.

Accordingly, it is the principal object of this invention to provide an improved device for crushing glass bottles and other glass containers; and more particularly, a device which is safer to use and more efficient than such devices presently available.

In accordance with the present invention, a bottle crusher is contemplated wherein the working parts are located in a closed housing, preferably a rectangular body, formed of sheets of plywood or any other thin sheets of substantially inflexible solid material, which is divided by a thick plywood partition which passes clear across the width of the housing, separating it into an upper intake chamber having a slot or opening in the top for receiving the intake bottles or other glass containers, and a lower exhaust chamber which accommodates a removable barrel or pail which is disposed to receive the final broken glass product.

Inside of the housing, below the intake opening or slot is a first sheet of plywood or other solid material, forming a plane inclined at a small angle X, the apex of which is directed inwardly relative to the horizontal plane. A concave metal sheet having a smooth surface slopes down from the intake opening and is tangential to the surface of the inclined plane. About two-thirds across the width of the upper housing chamber, the inclined plane terminates in an abutment which is formed with a third plywood or other solid sheet which is slanted inward forming an internal Y angle with the principal axis of the housing which approximates a right angle so that the angle $X'$ between the third sheet and a vertical plane from the abutment equals or slightly exceeds the angle X of the inclined plane. Parallel to and spaced apart from the third sheet is a fourth sheet of plywood or other solid material leaning inward from one vertical wall of the housing at a substantially equal angle $X'$, and forming with the third sheet a chute which confines and directs inwardly below the inclined sheet the bottles thrown in the rectangular slot at the top. Thus, the bottles dropped into the slot at the top of the housing roll down the concavity and the inclined plane to the abutment where they are directed by gravity to fall off into the inwardly-directed chute.

Supported by thick plywood partition which is connected in a horizontal plane between the inner walls about half-way up from the bottom of the housing, is a metal plate which serves as the base for a motor, having a vertical rotating shaft which extends downwards thru openings in the plywood partition and supporting plane and is fastened to the center of a battering ram which is disposed to rotate in a horizontal plane, operating to batter and smash the glass bottles and other glass objects as they fall down through the inwardly inclined shaft.

A pair of rubber flaps are suspended in vertically spaced-apart relation above the internal portions of the inclined plane to protect the user of the bottle crusher from being splashed with shards of broken glass bouncing up when the container is battered by the rotating battering ram.

A downwardly-directed frustoconical member located beneath the thick plywood partition focusses the shards, as they are battered to pieces in the chute into a pail or barrel located in the hollow lower section of the housing. A door permits the pail or barrel to be removed and emptied of the product glass shards at intervals during the process.

A particular feature of the invention is that the curvature at the intake sheet at the receiving slot and the angular relationships between the inclined plane and the chute in the intake section, with the suspended rubber flaps, are designed, together with the rapidly-rotating battering ram and frustoconical focussing device to permit glass bottles and other glass containers to be crushed quickly and efficiently, providing a readily recyclable product, with a minimum of danger to the user.

The structure and operation of the device of the present invention will be better understood from the detailed description of the invention in the specification hereinafter with reference to the attached drawings.

SHORT DESCRIPTION OF THE DRAWINGS

FIG. 1 is a perspective showing of the bottle crusher of the present invention in its closed housing with a bottle being dropped into the intake slot.

FIG. 2 shows the bottle crusher of FIG. 1 being opened at the bottom to remove the crushed glass product.

FIG. 3 is a top view of the bottle crusher of FIGS. 1 and 2.

FIG. 4 is a vertical section across the width of the bottle crusher of FIGS. 1 and 2, parallel to the intake slot along a plane indicated by the arrows 4—4 of FIG. 3.

FIG. 5 is a vertical section along the center line from front to back of the bottle crusher of FIGS. 1 and 2, along the plane indicated by the arrows 5—5 of FIG. 3.

FIG. 6 shows the motor used to drive the rotating battering ram of the bottle crusher of FIGS. 1 and 2, mounted on its removable mounting plate.

DETAILED DESCRIPTION OF THE INVENTION

Referring to FIGS. 1 and 2, there is shown a bottle crusher 1 in accordance with the present invention which is mounted in a rectangular cabinet 2, which is, say 22½ inches wide and 23 inches from front to back, in horizontal section and 42 inches high, and for convenience may be mounted on four conventional metal castors 3, 4, 5 and 6 (not shown).

The top, bottom, sides and back of the housing 2 may be formed of conventional rectangular plywood sheets, say, ½ inch thick, screwed or bolted or otherwise fastened together at the joints to form a cabinet closed, except for the slot 6 on the top, and the front, which is closed by the upper panel 2a and lower front door 2b, which is laterally hinged to open and close. The top panel is, say, 22 inches across and 16½ inches in a vertical direction. The lower door is, say, 22 inches across and 24 inches in a vertical direction.

Near the upper left-hand corner of the panel 2a is a small rectangular recess or panel which accommodates the "on" and "off" buttons for a conventional switch to start and stop the motor 7, as will be described hereinafter.

Referring to the top view as shown in FIG. 3, the intake slot 6 is rectangular, say 13 inches long and 6 inches wide. It is centered parallel to and, say, 2 inches in from the front edge, and, say, 4½ inches from each of the sides.

FIGS. 4 and 5 respectively show the internal section of the housing 2 as viewed along vertical planes, respectively parallel to the front and, parallel to the right-hand side.

The interior of the cabinet 2 is divided into upper and lower sections by a horizontal thick partition 13 which takes the form of a ¾ inch thick plywood sheet, the edges of which are bolted or screwed, or otherwise secured to opposite inside walls of the housing, say, 16½ inches below the top.

Parallel to and located 4 inches inside each of the upper sidewalls of the cabinet 2 are a pair of inner sidewalls 23 and 24. These form a rectangular inner enclosure which extends from the horizontal partition 13 to the inside surface of the top. The inner walls 23 and 24 are respectively fixed at each of the ends of the slot 6.

A sheet 8 forming an inclined plane, for example, of plywood, say, ¼ inch thick, is, say, 13¼ inches wide and 19½ inches long, and is bolted or screwed or otherwise secured along its front edge, parallel to and, say, 4 inches below the top of the front panel of cabinet 2. Its rear edge is supported internally, say, 9 inches below the top of cabinet 2 and 6 inches in from its rear wall, by the inwardly directed ½ inch thick plywood support 11 secured at its lateral ends to inner sidewalls 23 and 24. The support 11 is 8 inches long and 14 inches wide, resting on and secured at its lower end to the upper surface of partition 13 forming an inwardly directed acute angle X' of, say, 23 degrees with the vertical plane, and preferably, a right angle Y with the inclined plane 8. If Y is a right angle, then angle X' will equal X, the angle between the inclined plane and the horizontal plane. The angular abutting edge 10 formed between inclined plane 8 and the inwardly-directed support 11, is spaced, say, 6½ inches, from the rear wall of cabinet 2 and extends between the internal sidewalls 23 and 24 forming with the edge of inclined plane 8 an internal angle of, say, approximately 23 degrees.

Extending between the internal sidewalls 23 and 24, and disposed in a plane parallel to and in spaced-apart relation, say, 6 inches from the support 11, is a fourth sheet 12, of plywood or the like, say, ½ inch thick. Thus, the support 11 and plywood member 12 form between them an inwardly-directed chute 6 inches wide.

A steel ramp is formed by sheet 9, say, 1/16 inch thick, which is secured at its lateral edges between the inner sidewalls 23 and 24, and is interposed in curvalinear relation between the long front edge of the slot 6 and the upper surface of the inclined plane 8, with which it makes tangential contact along a line parallel to and about 9 inches in from the front panel of the housing 2.

Suspended from 1 inch diameter studs on the interior roof of the housing 2 along a vertical plane which intersects the concavely curved ramp sheet 9, substantially along the tangent line with the inclined plane 8, is a rectangular rubber flap 20 which is, say, ⅛ inch thick and 14 inches across the top and, say, 7 inches from top to bottom, and which swings freely inward when contacted by bottles rolling down the ramp 9, as will be explained. A second, slightly longer rubber flap 21, of substantially the same width and thickness as flap 20, is suspended from a second series of 1 inch studs on the interior roof of housing 2 along a vertical plane just ahead of the line formed by the abutting edge 10.

The present embodiment employs an alternating current motor 7, for example, Model 3M612, having a power capacity of ⅛ horsepower and designed for operation on 115 volts A.C., drawing a current of 5.3 Amperes. Motor 7 is connected to the on-off switch 2c by the electrical cable 29. In the present model, motor 7 is to rotate its shaft 15 at between 1000 and 1700 revolutions per minute. The motor assembly 7 is bolted or otherwise secured to the central upper surface of a ⅛ inch thick steel support plate 23, which is, say, 9 inches long, and 8½ inches wide, having a 3 inch high rear flange 23b, and a 2 inch high front flange 23b.

The steel support plate 23 is mounted on the partition 13. Centered in plate 23 is a circular slot 23d, which accommodates the vertically-extending shaft of motor 7. Partition 13 has an elongated slot 13c two inches wide, which extends 41½ inches from the center to the front edge, which accommodates vertically-extending motor shaft 15. The motor support plate 23 is held in place on the partition 13 by a set-screw or similar conventional means, not shown, which rides in and is screwed in place against slot 13c. Also, partition 13 is connected at its rear center by a hinge 16 which extends along a line parallel to the rear wall of cabinet 2.

A door 2d, which is say, 22 inches wide and 19 inches in a vertical plane, has a hinge 24 along one of its vertical edges, which permits the door to swing open in a lateral direction. Thus, if partition 13 is rotated downward about hinge 16, and the set-screw in slot 23c is loosened, the motor 7 on its support plate 23 can be slid out of its position on partition 13 and either repaired or replaced. (See FIG. 5.)

The motor 7 is connected by a cable 29 to the connection box 2c which is equipped with a plug for connection to a conventional 110 volt power outlet.

The shaft 15 which penetrates the slots 23a and 13a, is coupled at its lower end at the center of a rotatable steel battering ram 14 which is 14 inches long and two inches square in section. Welded or otherwise secured to the outer opposite ends of the battering ram 14 are a pair of ¾ inch steel blocks terminating in conical points which cause the blade 14 to function as a flywheel, transferring the energy from the center of the shaft to the flying weights.

Depending, say, 2¼ inches from the lower surface of the partition 13 is a circular flange 13d, say, 19½ inches in diameter, which constitutes support for a frustconical member 17. The latter is positioned to just surround the projection of the slot 6 on the partition 13. Frustoconical member 17 is formed of ⅛ inch thick steel which is 19 inches in diameter across the plane of its upper circular opening, and narrows down to as diameter of 8½ inches across a horizontal plane, a vertical distance 5 inches below the partition 13.

Immediately below the open end of the frustoconical member 17 is a compartment, say, 21¼ inches square and 24 inches deep, accessible by the door 2d, which compartment accommodates a can or barrel 25 which receives the crushed glass output from the frustoconical member 17.

OPERATION

The operation of the bottle crusher of the present invention is as follows.

A glass bottle 100 is dropped into the rectangular slot 6 on the top of the housing 2 with its long axis substantially parallel to the long axis of the slot. Bottle 100 rolls down ramp 9 and along inclined plane 8, progressively flexing the rubber flaps 20 and 21. When bottle 100 reaches the abutting edge, it drops into the chute formed between the supporting plate 11 and the plywood partition 12, falling down by gravity. Assuming that the plug 2c has been connected to a conventional 110 volt power outlet, and the power has been turned on, the motor 7 is operating to drive the ram 14 to rotate at a rate of, say, 1500 revolutions per minute.

When the bottle 100 falls down through the shaft between 11 and 12, it falls into the path of the rapidly spinning steel battering ram 14 and connected end blocks 14a and 14b, and is smashed. The smashed pieces bounce from the inside walls of the frustoconical member 17, and are channelled to fall below into the can 18 when the same is in position. From time-to-time, can 18 is removed to be emptied, and replaced by an empty can.

Assuming it is desired to repair or replace motor 7, the door 2d is opened, and the set-screw in the longitudinal slot 23 is released. The partition 13 is rotated to a downwardly inclined position, and the motor supporting plate 23, containing motor assembly 7, is slid down and removed through the open door.

A particular feature of the design of the present invention is that if a straight line were drawn from the inside end of slot 6 passing over abutment 10 and striking the wall 12 of the chute, projectable bouncing off a wall 12 at an equal angle of incidence would be directed internally into the chute, and not in the direction of the intake slot, thus reducing the danger to the operator from flying glass.

It will be understood that the structure of the bottle crusher of the present invention is not limited to that shown and described by way of example, but only by the recitation of the appended claims.

What I claim is:

1. A device for crushing glass bottles and other hollow glass objects which comprises in combination:

a housing having closed sides with interior and exterior surfaces, and an under surface, a top closed except for an intake slot for receiving the bottles and other glass objects;

said housing having an upper compartment and a lower compartment separated by a central substantially horizontal partition;

an opening for providing access to said lower compartment;

a first sheet comprising an inclined plane secured to the interior surface of a closed side of said housing adjacent to a long edge of said intake slot forming an intake chute;

a curvalinear intake ramp extending inwardly at one end from said intake slot and joined to said inclined plane tangentially at its other end;

said inclined plane forming an acute angle X with the horizontal plane, and terminating at its inner end beyond the end of said ramp in an abutting edge;

a second sheet comprising a support joined to said abutting edge, the exterior surface of said second sheet forming one wall of a receiving chute which is directed downwardly and inwardly at an acute angle X' below said first sheet comprising said inclined plane, a third sheet parallel to said second sheet forming the other wall of said receiving chute;

the interior surface of said second sheet comprising a support forming an internal angle Y with the under surface of said first sheet comprising said inclined plane, and forming therewith and with the upper surface of said central horizontal partition, an inner compartment;

driving means comprising a motor having a rotatable shaft supported by a portion of said central horizontal partition in said inner compartment;

an elongated rotatable battering ram coupled at its center in driven relation to said shaft for rotation in a substantially horizontal plane beneath said central horizontal partition so that the plane of rotation of said battering ram extends into the lower end of said receiving chute;

means comprising a frustoconical member, having a larger upper opening and a smaller lower opening, depending from said central horizontal partition and surrounding the plane of rotation of said battering ram, for directing the glass shards from said receiving chute out of the lower opening of said frustoconical member;

and means located below said frustoconical member for receiving and storing the glass shards from said receiving chute.

2. A device in accordance with claim 1 comprising at least one flap of elastomer material suspended in freely swinging relation from the inner surface of the closed top of said housing above said abutting edge for intercepting glass shards bouncing upward from said chute.

3. A device in accordance with claim 1 wherein the portion of said central horizontal partition supporting said motor is hinged, whereby said portion is constructed to be rotated downward about said hinge;

a supplemental steel support plate interposed between said motor and said central horizontal partition;

means for removably fastening said supplemental steel support plate to said partition.

4. A device in accordance with claim 1 wherein said angle Y approximates a right angle, and wherein the angles X and X' are substantially equal acute angles.

5. A device in accordance with claim 4 wherein said angles X and X' are acute angles of between 10 degrees and 30 degrees.

6. A device in accordance with claim 5 wherein the overall height of said housing is between 4 and 5 feet.

7. A device in accordance with claim 1 wherein said battering ram comprises at least one elongated steel blade centered on said shaft, the opposite ends of which are weighted by a pair of steel blocks terminating in conical points which cause said blade to function as a flywheel.

* * * * *